US007922928B2

(12) United States Patent
Lanciaux

(10) Patent No.: US 7,922,928 B2
(45) Date of Patent: Apr. 12, 2011

(54) COMPOSITION FOR FIRE FIGHTING AND FORMULATIONS OF SAID COMPOSITION

(76) Inventor: Marc Lanciaux, Layrac (FR)

( * ) Notice: Subject to any disclaimer, the term of this patent is extended or adjusted under 35 U.S.C. 154(b) by 193 days.

(21) Appl. No.: 12/250,417

(22) Filed: Oct. 13, 2008

(65) Prior Publication Data

US 2009/0146097 A1 Jun. 11, 2009

Related U.S. Application Data

(63) Continuation-in-part of application No. PCT/FR2007/051113, filed on Apr. 13, 2007.

(51) Int. Cl.
*A62D 1/00* (2006.01)
*C09K 21/00* (2006.01)

(52) U.S. Cl. ........................................... 252/2; 252/601

(58) Field of Classification Search ....................... 252/2
See application file for complete search history.

(56) References Cited

U.S. PATENT DOCUMENTS 4,459,213 A * 7/1984 Uchida et al. ................ 252/8.05
4,610,311 A 9/1986 Bronner et al.
4,950,410 A * 8/1990 Pennartz ........................... 252/7
6,828,437 B2 * 12/2004 Vandersall et al. ........... 536/114
2006/0076531 A1 * 4/2006 Hagguist et al. .................. 252/4
2007/0289752 A1 * 12/2007 Beck et al. ...................... 169/47

FOREIGN PATENT DOCUMENTS

CA 2 101 947 A1 8/1992
CA 2101947 A1 8/1992
EP 0 659 449 A 6/1995
EP 0659449 6/1995
FR 1 485 729 6/1967
FR 1485729 A 6/1967
FR 2 690 627 4/1993
FR 2690627 A 11/1993

OTHER PUBLICATIONS

Matz, Samuel A.; "Bakery Technology and Engineering", third edition, 1992, pp. 235-236.*

* cited by examiner

*Primary Examiner* — Mark Eashoo
*Assistant Examiner* — Peter Godenschwager
(74) *Attorney, Agent, or Firm* — Foley & Lardner LLP

(57) ABSTRACT

The purpose of the invention is a composition for fire fighting, characterized in that it includes at least a first compound in the form of a vegetable derived powder, soluble in cold water and thickening; a second compound in the form of a vegetable derived powder, insoluble in cold water but thickening and retaining water in hot water or in the presence of steam; a third compound including at least one agent encouraging the Maillard reaction of at least the first and/or second compounds, and water. The invention also relates to formulations of said composition.

2 Claims, No Drawings

COMPOSITION FOR FIRE FIGHTING AND FORMULATIONS OF SAID COMPOSITION

The present invention relates to a composition for fire fighting and formulations of said composition.

Fires are known to be difficult to fight with water and the result is unsatisfactory for many reasons. Water alone, used in large quantity, gives results when it comes into direct contact with the fire, but its efficiency is low.

In fact, enormous losses, of the order of 75 to 80%, are noticed due to the water running off because of its fluidity and due to the very high evaporation. The running-off, together with a low wettability coefficient, results in the water flowing on the ground and entering rapidly into the ground, especially in the event of a fire in a forest, whose grounds are not very water-tight.

As regards to evaporation, it causes losses at three stages:

at the first stage of the spray due to the mechanical means used: high rate hose nozzle, plane, helicopter, etc.;

the second stage is evaporation from supports which have been wetted but not yet attacked by fire. In this case, the heat developed by the generally quite close fire, the sun, and the wind in particular cause a large evaporation from these wet supports which only have little limitation effect on the fire spreading;

the third stage is evaporation during the spraying operation onto the fire source. It is in this stage that the spraying is directly efficient by absorbing a lot of energy during the phase change liquid/vapor, but with a very strong release of burning vapors and even toxic fumes.

To overcome these disadvantages, additives are usually added to the water, in particular so-called retardant additives, as well as colorants, in order to determine the areas having already been treated.

Examples of such additives include phosphates, ammonium sulfates and ammonium polyphosphates.

These additives can be used together with oxygen scavengers, foaming agents, anti-corrosion agents (such as ferrocyanide), viscosity modifiers, etc. Nevertheless, using these additives is not satisfying. First, indeed, such additives are toxic and/or polluting chemicals which should only be used in the natural environment in very limited amounts. Moreover, these additives hardly alter the run-off losses and evaporation, delayed in the first place, has been found to sharply develop with sudden heat releases. Foaming agents should also be used in low amounts, with the result that the protective coat presents a low resistance with time because the gas within the bubbles, when expanding with the heat, deconstructs the foam. As for the amount of water remaining after deconstruction, it is necessarily very limited in the case of a foam.

Another disadvantage regarding foaming solutions is the difficulty in spraying especially in case of wind, the small spraying distance and the low control of direction. Thus, in case of forest fires, tree tops are not reached and this allows the fire to jump in the air.

Gel-forming agents with very low solids content, i.e. 0.01% by weight, have also been added to increase the viscosity, which has an effect on the run-off, but they do not alter the evaporation rate. Also, currently used gel-forming agents get thinned in contact with the fire and the solids content is too low to have an effect. Gel-forming agents are not much compatible with saline water, such as sea water, which is also a disadvantage. Finally, the efficiency remains very limited, since tests show a rekindle of a support in a main fire within 2 minutes and 30 seconds. Further, it has been noticed that during fires incandescent carbon particles called flashes which are carried away by winds and drafts, also spread a fire: it would be desired to ballast the particles with the remaining solids, which is not done with the additives currently in use. This low fire-retarding ability and the short period of time these additives are efficient force to intervene close to the fire source, with all the risks and dangers incurred.

Finally, using additive-added water, according to the prior art embodiments, does not enable to employ a medium-pressure spray, i.e. in the range of 30 to 200 bars, for the yields are regarded as insufficient, with the fine spray increasing the overhead evaporation. Yet the use of a medium pressure spray would improve the application accuracy, limit the amount of water used and increase the covering and coating capacity, while staying sufficiently away from the fire source.

The object of the present invention is to overcome these disadvantages and in particular it prevents any impact on the natural environment, increases the quenching capacity even after evaporation and restrains the rekindle capacity of the fire source, ballasts the incandescent particles in post-combustion, provides a visual contrast on the treated areas without adjunction of colorants, enables vertical clinging, enhances the application capacity.

The composition according to the present invention can also be formulated in different ways depending on the applications, either for spraying, in particular for medium-pressure spraying, or for providing barriers. The composition according to the present invention includes at least:

a first plant-derived thickening compound, soluble in cold water, which is in the form of a powder, a second plant-derived compound, insoluble in cold water, which is in the form of a powder, but which is thickening and water-retaining in hot water or in the presence of steam, a third compound including at least one agent promoting the Maillard reaction of the at least first and/or second compounds, and water.

The first compound, in the form of a powder, is more particularly selected from: guar flour, carob flour, modified starches, alginates, xanthan gum, gum arabic, cellulose, cellulose derivatives, and natural plant-derived or bacterial polysaccharides.

Said first compound should be free from oils and/or essences.

The object of the first thickening compound is to maintain, within the composition, the particles in suspension to provide the medium with homogeneity. The amount of the first compound is adjusted according to the sizes of the particles to be maintained in suspension; the first compound is capable of preventing decantation. The amount of the first compound is preferably from 1 to 20 grams per liter of water.

It is to be noted that such a first compound is non-foaming and water-soluble, including in salted water.

The second compound, in the form of a powder, is more particularly selected from native starches and more particularly from native starches with large-size granules and/or starches rich in phosphates, and even more particularly from potato starches. Native starches are starches which have not been chemically or physically modified (destructuration).

Native starch consists of at least two polymers, amylose and amylopectine. The latter provides the starch with a semi-crystalline structure and thus makes it insoluble in water. Native starch is in the form of grains with grain sizes ranging from a few microns to a few tens of microns, depending on the plant it is derived from. The advantage is to select native starch including a majority, in volume (more than 50% in volume, preferably more than 80% in volume), of grains with sizes above 10 μm, preferably with sizes ranging from 40 to 150 μm; which is the case for native starch from potatoes, known as potato starch.

Mainly, native starch has the capacity of swelling from 60° C., when is it suspended in water. This swelling capacity corresponds to the starch grains gradually going into solution, mainly amorphous amylose macromolecules, resulting in a thickening of the medium.

The amount of the second compound is preferably from 5 to 100 grams per liter of water.

The third compound comprises at least one agent promoting the Maillard reaction of the at least first and second compounds: this third compound is more particularly selected from the group consisting of monovalent and divalent salts of Na, K, Ca, Mg with halogens Cl, Br and F, preferably sodium chloride. Sodium chloride is added or at least partly inherently present if sea water is used as the water.

Fast carbonization, at least on the surface, even if the composition contains water, has numerous consequences, including:

- a very absorbing black coloration which limits thermal radiation,
- a limitation of the thermal wave spreading,
- energy absorption which promotes the hydrothermal swelling of the second compound,
- the carbonized coat which limits the evaporation rate of the water, and
- the support which is strongly starved of combustion oxygen.

Furthermore, sodium chloride has natural fire-retarding properties which are also utilized.

Said third compound also helps, through a synergic effect, to increase the water-retention capacity of the at least first and second compounds.

The amount of the third compound preferably is from 2 to 20 grams per liter of water.

The composition according to the invention can be improved by adding further compounds.

Thus, the composition is admixed with a fourth compound, which is water-soluble and film-forming. Said fourth compound is preferably a natural film-forming agent.

Said fourth compound more particularly consists of a protein powder of plant origin (gluten, zein, potato protein, soya protein, etc.) or animal origin (casein), for example egg white powder.

Said fourth compound thus provides for some encapsulation and binds the grains of the second compound during swelling under heat, leading to a foam being generated by the steam at the start of the thermal exposure.

Said fourth compound can also be subjected to carbonization in a Maillard reaction, further improving the above-described effects.

According to an alternative, the composition includes a fifth compound which is a non-soluble, thinnable, ballast compound.

Said fifth compound is selected from mineral powders and more particularly clay powders, in particular white clay powders. Said fifth compound is optional and is particularly preferred in case the fire generates flashes, for example in forest fires, or if a persistent coloration is desired.

Preferably, clay powders are the least mechanically aggressive. If these powders are white clay powders, the areas treated with the composition according to the invention can be visually spotted.

Ballasting prevents spreading via flashes generated during the combustion of parts of the support.

The composition can further include a mineral powder.

It is to be noticed that the composition according to the invention preferably only contains natural compounds, which are not toxic or harmful to the environment. In particular, the composition does not contain phosphates, sulfates (ammonium sulfate) or polyphosphates (ammonium polyphosphate).

The composition can both be used for direct fire-fighting and for prevention, or else as a fire-retardant.

A composition according to the invention is obtained by mixing with water the different compounds, which are preferably in the form of a powder.

Preferably, the ratios of each of the compounds, as a percentage on a weight basis, based on the total weight of the dry composition (i.e. free from water) are:

- 2 to 10%, more preferably from 4 to 8%, for the first compound;
- 40 to 80%, more preferably from 50 to 70%, for the second compound;
- up to 25%, more preferably up to 20%, for the third compound;
- 0.2 to 3%, more preferably from 0.5 to 2%, for the fourth compound;
- 0 to 30%, more preferably from 0 to 25%, for the fifth compound;

This dry composition is then diluted with water, which may be fresh water or salted water such as sea water. The dry composition is preferably diluted with water at between 3 and 20% by weight, more preferably between 5 and 10% by weight, based on the total weight of the composition (dry composition+water).

In one particular embodiment, fitted for medium-pressure spraying, preferably from 30 to 120 bars, the amounts for one liter of water are the following, respectively:

- for the first compound: 3 to 14 grams of guar flour;
- for the second compound: 20 to 30 grams of starch potato;
- for the third compound: 10 to 14 grams of sodium chloride;
- for the fourth compound: 0.2 to 2 grams of egg white powder;
- for the fifth compound: 5 to 40 grams of clay powder.

It should be noted that this spraying is possible since there is no foaming agent, which also prevents any cavitating or unpriming of the pumps.

These values are to be adjusted depending on the type of fire and the articles to be protected. Things are different for a straw fire, a forest fire, or in the presence or in the absence of houses.

Tests have been done on a wooden support sprayed with the composition according to the invention, leaving a one (1) millimeter thick coat. This support is exposed during several minutes to a direct flame. The composition according to the invention carbonizes and swells up to a thickness of several millimeters, more specifically up to eight to nine millimeters thick. This composition is scraped after removal of the fire exposure from the support, revealing the wooden support unchanged, without any sign of carbonization.

The composition can be used to attack a fire directly on the fire source in order to quench the fire but also as prevention or as a retardant.

This composition can be formulated in liquid form as indicated and be applied by spraying with known fire-fighting techniques. This composition can also be formulated in the form of a solid, more particularly in the form of a gel.

Thus, adding a gel-forming agent to the composition according to the invention enables to make gel tapes, gel balls or gel blocks.

As regards to gel tapes, a backing can be added to provide better mechanical performance, in particular to make tape rolls and to allow for easy handling.

One side can also be coated with a reflecting, more particularly lightly colored, element on the one hand to limit evaporation and on the other hand to reflect heat.

Such a tape can be unwound and positioned as a fire-retardant to limit the spreading of the fire. As the fire gets closer and the temperature increases, the composition reacts as in the case of a liquid composition and provides a total barrier to spreading.

Gel balls can be mechanically thrown at long distances, with a high accuracy, by any convenient means.

As regards to blocks, they can also be distributed in specified places.

Another formulation can be a granulate of said gel and a dispensing by such means as road salting vehicles, thus providing the forming of ridges. It is to be noticed that this formulation is of great advantage for the fire-fighters who, using such materials, prevent the fire from spreading. Thus, even in the event of a circular fire, it is possible to isolate a protective area and, since the composition does not release toxic substances, then these fire-fighters can best safeguard themselves, or even save their lives.

In order to obtain a sufficiently compact gel, while maintaining the composition properties, a gel-forming agent can also be added which has thermal liquefaction properties, such as gelatin from animal origin. Preferably, the gelatin is one having a bloom degree of 200 to 300 blooms, to achieve the required viscosity and the required melting temperature.

The composition according to the present invention, in whichever formulation, yields extremely high performances. The composition according to the invention includes from 44 to 150 grams of solids per liter of composition.

Thus, in comparison, 1150 kg of aqueous composition according to the present invention would require 20 $m^3$ of water, i.e. 20 000 kg of water.

The load to be transported is therefore extremely reduced, as well as the volume.

EXAMPLE 1

Plate Flammability Test

The aim is to determine the ignition time of plates made of Isorel (200×40×3 $mm^3$), either protected or non-protected by a fire-retarding substance, and also to know the effect of the composition of the fire-retarding substance.

The formulations according to the invention are prepared as indicated in the following examples. The suspensions obtained are left for 30 sec under intense stirring and then poured into a flat base tank.

The Isorel plate is dipped for 5 sec in the suspension then tipped over the tank at an angle of 45° for 15 sec. The Isorel plate is thus covered with the suspension forming a 1-2 mm thick coat. The plate is then positioned above a radiant element so that the temperature at which the plate is exposed is around 500° C. The time at which a persistent flame appears is recorded as the ignition time ($t_{flame}$). For reproducibility reasons, the test is performed on a total of three plates and at increasing times from the time the suspension is prepared ($t_0$).

EXAMPLE 1a

A formulation according to the invention is prepared by adding to 950 mL of fresh water, under intense stirring:

5 g of guar gum
30.5 g of potato starch
8 g of salt
4 g of gel-forming agent
2 g of egg white powder
0.5 g of mineral powder.

COMPARATIVE EXAMPLE 1a

A formulation according to the invention is prepared by adding to 950 mL of fresh water, under intense stirring:

5 g of guar gum
38.5 g of potato starch
8 g of salt
4 g of gel-forming agent
0.5 g of mineral powder.

Table 1 below shows ignition times ($t_{flame}$) for the various formulations (Example 1a and Comparative Example 1a) in comparison with the ignition time of plates, both non-treated and treated with water.

TABLE 1

Conventional flammability tests

| | $t_{flamme}$ (sec) | | | |
|---|---|---|---|---|
| | Ø | water | Example 1a | Comparative Example 1a |
| $t_0$ + 10 min | 35 ± 4 | 37 ± 3 | 72 ± 9 | 61 ± 5 |
| $t_0$ + 20 min | — | — | 84 ± 7 | 64 ± 1 |
| $t_0$ + 30 min | — | — | 83 ± 7 | 61 ± 5 |

Before ignition, as from exposure of the plate to high temperatures, the thin suspension coat (e=1-2 mm) swells and foams to a thickness of several millimeters, i.e. eight to nine millimeters. The suspension carbonizes and forms a black film on the surface of the Isorel plate. A few moments later, the plate ignites. The ignition times thus appear to be larger in the presence of formulations according to the present invention (Example 1a), in particular in the presence of egg white powder (Comparative Example 1a).

After the test, for any formulation of Example 1a and Comparative Example 1a, the black film, when removed, reveals the support untouched.

EXAMPLE 2

Clinging Test

The aim of these tests is to determine the fire resistance of the Isorel plates at given coating rates. Formulations according to the invention are thus prepared as indicated in Examples 2a and 2b and left under intense stirring for 30 sec. After 10 min, the suspension is further stirred for 10 sec then poured into a flat base tank.

The Isorel plate is then dipped in the suspension then weighed. Any matter in excess is removed to achieve the desired coating rate. The plate treated in this way is then positioned to be irradiated under a radiant element (about 200° C.). The time at which the first persistent flame appears is recorded as $t_{flame}$.

EXAMPLE 2a

A formulation according to the invention is prepared by adding to 950 mL of water, under intense stirring:

5 g of guar gum
31 g of potato starch 8 g of salt
4 g of gel-forming agent
2 g of egg white powder EXAMPLE 2b A formulation according to the invention is prepared by adding to 950 mL of water, under intense stirring:

10 g of guar gum
62 g of potato starch
16 g of salt
8 g of gel-forming agent
4 g of egg white powder.

Table 2 below shows the clinging test data.

TABLE 2

| Clinging test results | | | |
|---|---|---|---|
| Coating rate | $t_{flamme}$ (sec) | | |
| ($L/m^2$) | Ø | Example 2a | Example 2b |
| 0 | 71 ± 4 | — | — |
| 0.7 | — | 154 ± 24 | 243 ± 13 |
| 1.2 | — | 222 ± 51 | 329 ± 13 |
| 2.6 | — | 300 ± 20 | 689 ± 35 |

These results show that the formulations according to the invention enable to considerably increase the ignition times of the wooden support. Also, the fire resistance is at least increased by a factor of two. Further, there is a matter effect: the more matter there is, the better the fire resistance.

Two further tests have been performed with the formulation indicated in Example 2a. The first test was set up to determine the maximum formulation load that can be accepted by a plate and to define the corresponding fire resistance. Thus, the previously weighed Isorel plate was coated with the formulation of Example 2a so as to carry a maximum amount of matter without it flowing. The maximum coating rate is then 3.5 $L/m^2$. The above-described clinging test thus indicates an ignition time of 13 min and 43 sec, i.e. 823 sec.

The second test involves determining the coating rate and the fire resistance of an Isorel plate when the latter is coated with a maximum amount of the formulation of Example 2a, then positioned vertically for 1 minute. The clinging test demonstrates a maximum coating rate of 2.8 $L/m^2$ and an ignition time of 12 min and 11 sec, i.e. 731 sec.

These last two tests show that the fire resistance of the Isorel plates under the conditions of the clinging test (T=200° C., formulation of Example 2a) can by increased by a factor up to 10 or 11, as compared with the protection with water.

The invention claimed is:

1. A composition for fire fighting, characterized that it includes:

guar flour, in the amount of 3 to 14 grams,
potato starch, in the amount of 20 to 30 grams,
sodium chloride, in the amount of 10 to 14 grams,
egg white powder, in the amount of 0.2 to 2 grams,
clay powder, in the amount of 5 to 40 grams, and
water, wherein the amounts are expressed for one liter of water.

2. A dry composition for fire fighting, containing only natural compounds, which are not toxic or harmful to the environment, and including, as a percentage on a weight basis, based on the total weight of the dry composition:

2 to 10% of guar flour,
40 to 80% of potato starch,
0 to 25% of sodium chloride,
0.2 to 3% of egg white powder,
0 to 30% of clay powder.

* * * * *